(12) United States Patent
Wu et al.

(10) Patent No.: US 11,436,409 B2
(45) Date of Patent: Sep. 6, 2022

(54) METHOD AND APPARATUS FOR UPDATING SUBJECT NAME INFORMATION OF A TARGET INFORMATION SOURCE

(71) Applicant: Beijing Baidu Netcom Science and Technology Co., Ltd., Beijing (CN)

(72) Inventors: Zhipeng Wu, Beijing (CN); Zhihua Wang, Beijing (CN); Tianxing Yang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 430 days.

(21) Appl. No.: 16/458,427

(22) Filed: Jul. 1, 2019

(65) Prior Publication Data
US 2020/0073928 A1 Mar. 5, 2020

(30) Foreign Application Priority Data
Aug. 29, 2018 (CN) .......................... 201810998037.6

(51) Int. Cl.
*G06F 40/253* (2020.01)
*G06F 40/295* (2020.01)
(Continued)

(52) U.S. Cl.
CPC .......... *G06F 40/232* (2020.01); *G06F 40/253* (2020.01); *G06F 40/295* (2020.01); *G06F 40/30* (2020.01)

(58) Field of Classification Search
None
See application file for complete search history.

(56) References Cited

U.S. PATENT DOCUMENTS 7,360,151 B1 * 4/2008 Froloff .................. G06F 40/186
715/255
9,037,578 B2 * 5/2015 Brust .................... G06F 3/0481
707/726
(Continued)

FOREIGN PATENT DOCUMENTS

CN 102216928 A 10/2011
CN 104182535 A 12/2014
(Continued)

OTHER PUBLICATIONS

Fang et al., "Exploring Syntactic Features for Pronoun Resolution Using Context-Sensitive Convolution Tree Kernel", International Conference on Asian Language Processing, 2009, pp. 201-205.

*Primary Examiner* — Ariel Mercado
(74) *Attorney, Agent, or Firm* — The Webb Law Firm

(57) ABSTRACT

Embodiments disclose a method and apparatus for updating subject name information of a target information source. A specific embodiment of the method includes: acquiring at least one subject name from to-be-processed information; matching, for a subject name in the at least one subject name, the subject name with pre-acquired at least one initial information source subject name, and setting a weight for the subject name based on a matching result; and sorting the subject name in the at least one subject name and an initial information source subject name in the at least one initial information source subject name according to the weight to obtain updated at least one initial information source subject name.

13 Claims, 6 Drawing Sheets

(51) Int. Cl.
*G06F 40/232* (2020.01)
*G06F 40/30* (2020.01)

(56) References Cited

U.S. PATENT DOCUMENTS

| | | | |
|---|---|---|---|
| 9,047,283 B1* | 6/2015 | Zhang | G06F 16/24578 |
| 2006/0224570 A1* | 10/2006 | Quiroga | G06F 16/90332 |
| | | | 707/E17.139 |
| 2009/0326919 A1* | 12/2009 | Bean | G06F 40/289 |
| | | | 704/9 |
| 2010/0313258 A1* | 12/2010 | Chaudhuri | G06F 40/247 |
| | | | 726/9 |
| 2011/0301941 A1* | 12/2011 | De Vocht | G06F 40/216 |
| | | | 704/9 |
| 2014/0142922 A1 | 5/2014 | Liang et al. | |
| 2015/0331850 A1 | 11/2015 | Ramish | |
| 2016/0117311 A1 | 4/2016 | Maetz et al. | |

FOREIGN PATENT DOCUMENTS

| | | |
|---|---|---|
| JP | H8305710 A | 11/1996 |
| JP | 2008112432 A | 5/2008 |
| JP | 2011248409 A | 12/2011 |
| JP | 2012252541 A | 12/2012 |

* cited by examiner

METHOD AND APPARATUS FOR UPDATING SUBJECT NAME INFORMATION OF A TARGET INFORMATION SOURCE

CROSS-REFERENCE TO RELATED APPLICATION

This application claims priority to Chinese Patent Application No. 201810998037.6 filed Aug. 29, 2018, the disclosure of which is hereby incorporated by reference in its entirety.

TECHNICAL FIELD

Embodiments of the present disclosure relate to the field of data processing technologies, specifically to a method and apparatus for updating information.

BACKGROUND

With the improvement of the degree of informatization, a large amount of data has been accumulated in many fields, and web fictions belong to one of the fields. Generally, contents of a web fiction may be published on the Internet at different times in the chronological order of the contents of the fiction. A user may acquire the latest published content of the web fiction through the Internet.

SUMMARY

Embodiments of the present disclosure provide a method and apparatus for updating information.

In a first aspect, the embodiments of the present disclosure provide a method for updating information, including: acquiring at least one subject name entry from to-be-processed information; matching, for a subject name entry in the at least one subject name entry, the subject name entry with pre-acquired at least one initial information source subject name entry, and setting a weight for the matched subject name entry based on a matching result, the initial information source subject name entry and the to-be-processed information corresponding to the same information source, and the weight being used to represent a probability that a subject corresponding to the matched subject name entry is an information source subject of the information source; and sorting the subject name entry in the at least one subject name entry and an initial information source subject name entry in the at least one initial information source subject name entry according to the weight to obtain updated at least one initial information source subject name entry.

In some embodiments, the acquiring at least one subject name entry from to-be-processed information, includes: querying a grammatical relationship of a sentence in the to-be-processed information; correcting the sentence contained in the to-be-processed information according to the grammatical relationship to obtain updated to-be-processed information; and performing information extraction on the updated to-be-processed information to obtain the at least one subject name entry.

In some embodiments, the correcting the sentence contained in the to-be-processed information according to the grammatical relationship to obtain updated to-be-processed information, includes: querying at least one to-be-processed sentence in the to-be-processed information, where the to-be-processed sentence is a sentence lacking a subject name entry; and adding, for a to-be-processed sentence in the at least one to-be-processed sentence, a subject name entry to the to-be-processed sentence according to the grammatical relationship corresponding to the to-be-processed sentence to obtain corrected updated to-be-processed information.

In some embodiments, the adding a subject name entry to the to-be-processed sentence according to the grammatical relationship corresponding to the to-be-processed sentence, includes: adding a corresponding subject name entry to the to-be-processed sentence according to the grammatical relationship.

In some embodiments, the to-be-processed sentence includes a subject name pronoun, and the adding a subject name entry to the to-be-processed sentence according to a grammatical relationship corresponding to the to-be-processed sentence, includes: replacing the subject name pronoun in the to-be-processed sentence with a corresponding subject name entry according to the grammatical relationship.

In some embodiments, the initial information source subject name entry is acquired by steps as follows: acquiring at least one initial subject name entry from acquired to-be-processed summary information; determining, for an initial subject name entry in the at least one initial subject name entry, the number of identical entries of the initial subject name entry in the to-be-processed summary information, and setting an initial weight for the initial subject name entry according to the number; and determining the at least one initial information source subject name entry from the at least one initial subject name entry according to the initial weight.

In a second aspect, the embodiments of the present disclosure provide an apparatus for updating information, including: a subject name entry acquisition unit, configured to acquire at least one subject name entry from to-be-processed information; a weight setting unit, configured to match, for a subject name entry in the at least one subject name entry, the subject name entry with pre-acquired at least one initial information source subject name entry, and set a weight for the matched subject name entry based on a matching result, the initial information source subject name entry and the to-be-processed information corresponding to the same information source, and the weight being used to represent a probability that a subject corresponding to the matched subject name entry is an information source subject of the information source; and an information updating unit, configured to sort the subject name entry in the at least one subject name entry and an initial information source subject name entry in the at least one initial information source subject name entry according to the weight to obtain updated at least one initial information source subject name entry.

In some embodiments, the subject name entry acquisition unit includes: a grammatical relationship querying subunit, configured to query a grammatical relationship of a sentence in the to-be-processed information; an updated to-be-processed information acquisition subunit, configured to correct the sentence contained in the to-be-processed information according to the grammatical relationship to obtain updated to-be-processed information; and a subject name entry extraction subunit, configured to perform information extraction on the updated to-be-processed information to obtain the at least one subject name entry.

In some embodiments, the updated to-be-processed information acquisition subunit includes: a to-be-processed sentence querying module, configured to query at least one to-be-processed sentence in the to-be-processed information, where the to-be-processed sentence is a sentence lacking a subject name entry; and an updated to-be-processed information acquisition module, configured to add, for a to-be-processed sentence in the at least one to-be-processed sentence, a subject name entry to the to-be-processed sentence according to the grammatical relationship corresponding to the to-be-processed sentence to obtain corrected updated to-be-processed information.

In some embodiments, the updated to-be-processed information acquisition module includes: an information adding submodule, configured to add a corresponding subject name entry to the to-be-processed sentence according to the grammatical relationship.

In some embodiments, the to-be-processed sentence includes a subject name pronoun, and the updated to-be-processed information acquisition module includes: an information replacing submodule, configured to replace the subject name pronoun in the to-be-processed sentence with a corresponding subject name entry according to the grammatical relationship.

In some embodiments, the apparatus includes an initial information source subject name entry acquisition unit, configured to acquire the initial information source subject name entry, and the initial information source subject name entry acquisition unit includes: an initial subject name entry acquisition subunit, configured to acquire at least one initial subject name entry from acquired to-be-processed summary information; an initial weight setting subunit, configured to determine, for an initial subject name entry in the at least one initial subject name entry, the number of identical entries of the initial subject name entry in the to-be-processed summary information, and set an initial weight for the initial subject name entry according to the number; and an initial information source subject name entry determining subunit, configured to determine the at least one initial information source subject name entry from the at least one initial subject name entry according to the initial weight.

In a third aspect, the embodiments of the present disclosure provide a server, including: one or more processors; and a storage apparatus, storing one or more programs thereon, the one or more programs, when executed by the one or more processors, cause the one or more processors to implement the method for updating information in the first aspect.

In a fourth aspect, the embodiments of the present disclosure provide a computer readable medium, storing a computer program thereon, the program, when executed by a processor, implements the method for updating information in the first aspect.

The method and apparatus for updating information provided by the embodiments of the present disclosure, first acquire at least one subject name entry from to-be-processed information, then match the subject name entry with pre-acquired at least one initial information source subject name entry, and set a weight for the subject name entry based on a matching result, and finally sort the entries according to the weight to obtain updated at least one initial information source subject name entry, thereby improving the accuracy and efficiency of acquiring information by a user.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
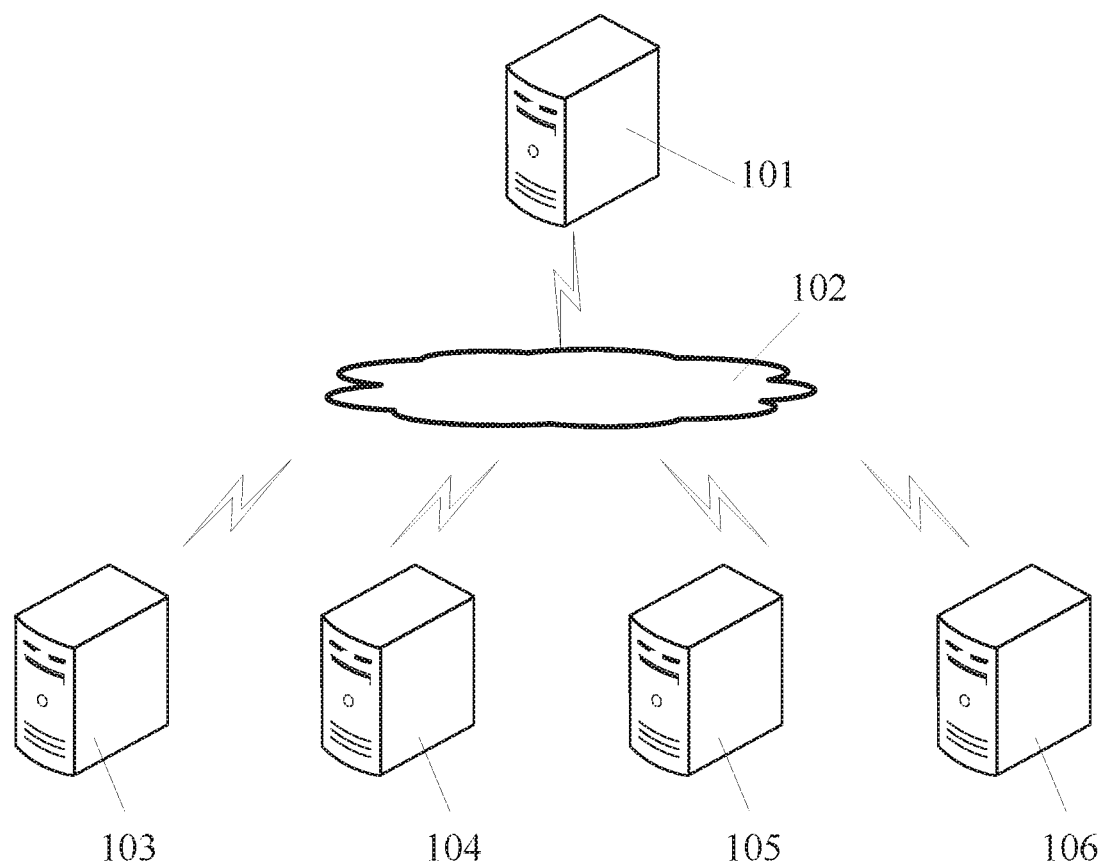
FIG. 1 is an exemplary system architecture diagram to which an embodiment of the present disclosure may be applied.

FIG. 1 illustrates an exemplary system architecture 100 to which an embodiment of a method for updating information or an apparatus for updating information of the embodiments of the present disclosure may be applied.

As shown in FIG. 1, the system architecture 100 may include a data processing server 101, a network 102, and information servers 103, 104, 105, 106. The network 102 is configured to provide a communication link medium between the data processing server 101 and the information servers 103, 104, 105, 106. The network 102 may include a variety of connections, such as wired, wireless communication links, or optic fibers.

The data processing server 101 interacts with the information servers 103, 104, 105, 106 via the network 102 to receive or transmit messages and the like. Various data processing applications may be installed on the data processing server 101, such as an information display application, a semantic recognition application, or an information extraction application.

The data processing server 101 may be hardware or software. When being hardware, the data processing server 101 may be various electronic devices having display screens and supporting data processing, including but not limited to tablets, laptop portable computers, desktop computers, etc. When being software, the data processing server 101 may be installed in the above-listed electronic devices. The data processing server 101 may be implemented as a plurality of software or software modules (for example, for providing distributed services), or as a single software or software module, which is not specifically limited here.

The information servers 103, 104, 105, 106 may be servers that provide various information services, such as servers that receive information sources from other terminal devices (e.g., may be web fictions, blogs, etc.) and process the received information sources. The servers may provide an information source to the data processing server 101 and receive feedback information (for example, may be information source subject name information, etc.) of the corresponding information source returned by the data processing server 101.

It should be noted that the method for updating information provided by the embodiments of the present disclosure is generally executed by the data processing server 101. Accordingly, the apparatus for updating information is generally provided in the data processing server 101.

It should be noted that the server may be hardware or software. When being hardware, the server may be implemented as a distributed server cluster composed of multiple servers, or as a single server. When being software, the server may be implemented as a plurality of software or software modules (e.g., for providing distributed services), or as a single software or software module, which is not specifically limited here.

It should be noted that the numbers of the data processing server, the network and the information server in FIG. 1 are merely illustrative. Any number of data processing server, network and information server may be provided based on the implementation requirements.

Figure 2:
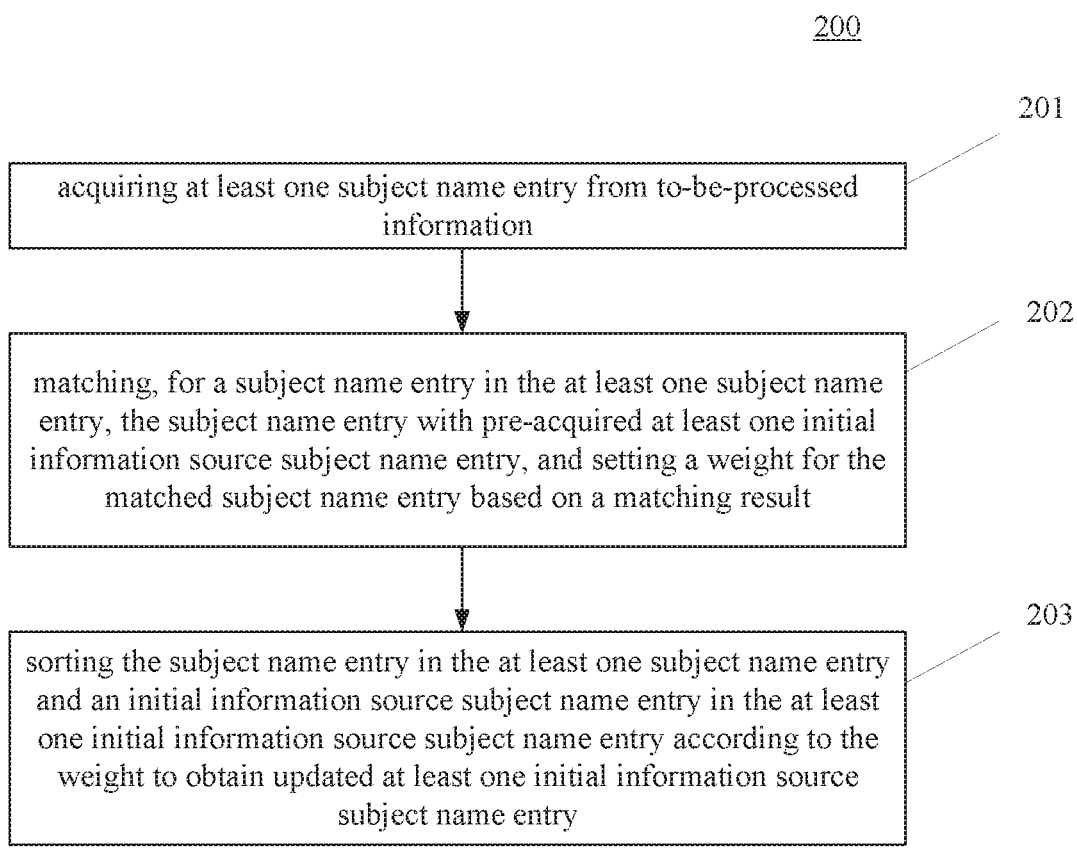
FIG. 2 is a flowchart of an embodiment of a method for updating information according to the present disclosure.

With further reference to FIG. 2, a flow 200 of an embodiment of a method for updating information according to the present disclosure is illustrated. The method for updating information includes the following steps 201 to 203.

Step 201 includes acquiring at least one subject name entry from to-be-processed information.

In the present embodiment, an executing body (for example, the data processing server 101 shown in FIG. 1) of the method for updating information may acquire to-be-processed information from the information servers 103, 104, 105, 106 through a wired connection or a wireless connection. The to-be-processed information may contain partial information (e.g., may be some sections of recently updated web fictions, etc.) of the above information sources (e.g., may be web fictions, blogs, etc.). It should be noted that the above wireless connection may include but is not limited to 3G/4G connection, WiFi connection, BLUETOOTH connection, WiMAX connection, ZIGBEE connection, UWB (ultra wideband) connection, and other wireless connection methods that are now known or to-be-developed in the future.

Generally, information sources such as web fictions and blogs have relatively fixed information source subjects, and an information source subject may play a key role to the information content of the information source. For example, the information source subject may be a person, an animal, a cartoon character, a robot, etc., and the information source subjects may be different according to different information sources. Generally, the information source subject may be included in any information content of the information source. Moreover, since the above information source is usually not completely published on the Internet at one time, it is not easy for the user to determine the information source subject of an information source, and the efficiency of acquiring information by the user is reduced.

The information source of the present disclosure typically includes a plurality of relatively fixed information source subjects. The content of the information source (such as the to-be-processed information described above) generally updates over time. The information source subject in the present disclosure may be a person, an animal, a cartoon character, or the like for displaying various information contents included in the information source. After acquiring the to-be-processed information, the executing body of the present disclosure may first acquire at least one subject name entry from the to-be-processed information. The subject name entry may be: "Zhang XX", "Li XX", "Kung Fu X Cat", "Little Bear", etc., and detailed description thereof will be omitted.

In some alternative implementations of the present embodiment, the acquiring at least one subject name entry from to-be-processed information may include the following three steps.

First step includes: querying a grammatical relationship of a sentence in the to-be-processed information.

In order to determine the information source subject of the information source, it is necessary to first perform data processing on the to-be-processed information related to the information source. The executing body may process such as perform semantic analysis on the to-be-processed information to determine the grammatical relationship of the sentence contained in the to-be-processed information. The grammatical relationship not only determines the sentence structure of the sentence, but also confirms possible subject name entries based on the sentence structure. In order to accurately acquire the information source subject name entry of the information source, the executing body may first query the grammatical relationship of each sentence in the to-be-processed information.

Second step includes: correcting the sentence contained in the to-be-processed information according to the grammatical relationship to obtain updated to-be-processed information.

Generally, in order to smooth the information description process, some sentence components (such as a subject, a predicate, an object, a verb, an attributive, an adverbial, a complement, and a central word) are often omitted or replaced in a sentence. For the user (or reader) of the information source, the user may clearly and accurately know the sentence components omitted in the sentence through the context information. However, when the information source subject name entry of the information source is determined by the executing body of the present disclosure, a missing sentence component may affect the accuracy of the subsequent determination of the information source subject name entry. To this end, the executing body of the present disclosure may correct the corresponding sentence according to the obtained grammatical relationship, so that each sentence include essential sentence components. The sentence composition information having added sentence component is used as updated to-be-processed information. That is, the updated to-be-processed information is obtained by supplementing the sentence component of the sentence included in the to-be-processed information.

Third step includes performing information extraction on the updated to-be-processed information to obtain the at least one subject name entry.

It can be seen from the above analysis that the sentence included in the updated to-be-processed information is a sentence having complete sentence components. In this case, the executing body may perform information extraction on the updated to-be-processed information to obtain at least one subject name entry.

In some alternative implementations of the present embodiment, the correcting the sentence contained in the to-be-processed information according to the grammatical relationship to obtain updated to-be-processed information may include the following three steps.

First step includes querying at least one to-be-processed sentence in the to-be-processed information.

Generally, the to-be-processed information may include a plurality of sentences. Some sentences have complete sentence components, and some sentences may lack corresponding sentence components. The executing body may perform semantic recognition on a sentence contained in the to-be-processed information to determine the meaning of the sentence. Then, the sentence components of the sentence are matched according to the meaning. If it is found that the sentence omits the sentence component corresponding to the subject name entry, or the sentence component corresponding to some subject name entry is represented by a pronoun, the sentence may be regarded as a to-be-processed sentence. For example, a sentence contained in the to-be-processed information may be: "He doesn't know how to deal with, . . . ". Through context analysis, the executing body determines that the meaning of the sentence may be: "XX (name) does not know how to deal with". In this case, when the executing body matches the meaning with the sentence, it may be found that the real sentence component "XX" in the sentence is replaced by "he", and the executing body may use the sentence as the to-be-processed sentence. As another example, a sentence contained in the to-be-processed information may be: "There is no retreat when going back, . . . ". Through context analysis, the executing body determines that the meaning of the sentence may be: "If XX (name) goes back, there is no retreat, . . . ". In this case, when the executing body matches the meaning with the sentence, it may be found that the real sentence component "XX" in the sentence is omitted, and the executing body may use the sentence as a to-be-processed sentence. That is, the to-be-processed sentence in the present disclosure may be a sentence lacking a subject name entry. Since the solution of the present disclosure is used to determine the information source subject name entry of the information source, a sentence lacking a subject name entry may be regarded as the to-be-processed sentence. When solving other technical problems, the executing body may alternatively use sentences lacking other types of entries (for example, an address entry, a plant entry, etc.) as the to-be-processed sentences according to actual needs, and detailed description thereof will be omitted.

Second step includes adding, for a to-be-processed sentence in the at least one to-be-processed sentence, a subject name entry to the to-be-processed sentence according to a grammatical relationship corresponding to the to-be-processed sentence to obtain corrected updated to-be-processed information.

After obtaining the to-be-processed sentence, the executing body may determine the subject name entry missing from the to-be-processed sentence according to the grammatical relationship and the context information corresponding to each to-be-processed sentence. Then, the executing body may add the missing subject name entry to the position corresponding to the to-be-processed sentence, so that the to-be-processed sentence becomes a sentence having complete sentence components. The executing body may use the information obtained when all the to-be-processed sentences are added with the subject name entries as the updated to-be-processed information.

In some alternative implementations of the present embodiment, the adding a subject name entry to the to-be-processed sentence according to a grammatical relationship corresponding to the to-be-processed sentence may include: adding a corresponding subject name entry to the to-be-processed sentence according to the grammatical relationship.

As can be seen from the above description, the subject name entry may be missing from the to-be-processed sentence. In this case, the executing body may analyze the context of the to-be-processed sentence to determine the subject name entry missing from the to-be-processed sentence. The missing subject name entry is then added to the position corresponding to the to-be-processed sentence. For example, the to-be-processed sentence may be: "There is no retreat when going back, . . . ". Through context analysis, the executing body determines that the meaning of the sentence may be: "If XX (name) goes back, there is no retreat, . . . ". Then, the executing body may add "XX" to the subject position of the to-be-processed sentence, and the to-be-processed sentence with the added subject name entry is "If XX goes back, there is no retreat, . . . ".

In some alternative implementations of the present embodiment, the to-be-processed sentence may include a subject name pronoun (such as "he", "she", "they", or "it"), and the adding a subject name entry to the to-be-processed sentence according to a grammatical relationship corresponding to the to-be-processed sentence may include: replacing the subject name pronoun in the to-be-processed sentence with a corresponding subject name entry according to the grammatical relationship.

In the to-be-processed sentence, the subject name entry may alternatively be replaced by the subject name pronoun. In this case, the executing body may analyze the context of the to-be-processed sentence to determine an actual subject name entry corresponding to the subject name pronoun included in the to-be-processed sentence. Then, the executing body may replace the subject name pronoun in the to-be-processed sentence with the subject name entry.

Step 202 includes matching, for a subject name entry in the at least one subject name entry, the subject name entry with pre-acquired at least one initial information source subject name entry, and setting a weight for the matched subject name entry based on a matching result.

Generally, when performing data processing on the to-be-processed information, the executing body has pre-acquired an initial information source subject name entry of the information source corresponding to the to-be-processed information. The initial information source subject name entry and the to-be-processed information correspond to the same information source. For example, the information source is a web fiction, and the executing body has perform information analysis on overview file such as abstract of the web fiction to obtain the initial information source subject name entry of the web fiction. The to-be-processed information may be an update content of the web fiction that is subsequently and continuously published. That is, both the to-be-processed information and the initial information source subject name entry correspond to the web fiction.

The executing body may match the acquired subject name entry with the initial information source subject name entry. When the subject name entry is identical to a certain initial information source subject name, the executing body may set a higher weight for the subject name entry (i.e., the initial information source subject name entry) based on the original weight of the initial information source subject name entry. When the subject name entry is different from each initial information source subject name entry, the executing body may set a lower weight for the subject name entry. The weight may be used to represent the probability that the subject corresponding to the subject name entry is the information source subject of the information source.

Step 203 includes sorting the subject name entry in the at least one subject name entry and an initial information source subject name entry in the at least one initial information source subject name entry according to the weight to obtain updated at least one initial information source subject name entry.

After obtaining the weight of the subject name entry and the weight of the initial information source subject name entry, the executing body may arrange the subject name entry and the initial information source subject name entry in a descending order of the weights. Then, the executing body may determine preset number of top-ranked subject name entries and/or initial information source subject name entries as the updated initial information source subject name entries. When new to-be-processed information is released, the executing body may use the updated initial information source subject name entry as the initial information source subject name entry, and perform the above steps to implement a second determination of the information source subject of the information source. In this way, the continuous updating of the information source subject is realized, and the accuracy and efficiency of acquiring information of the information source by the user are improved.

Figure 3:
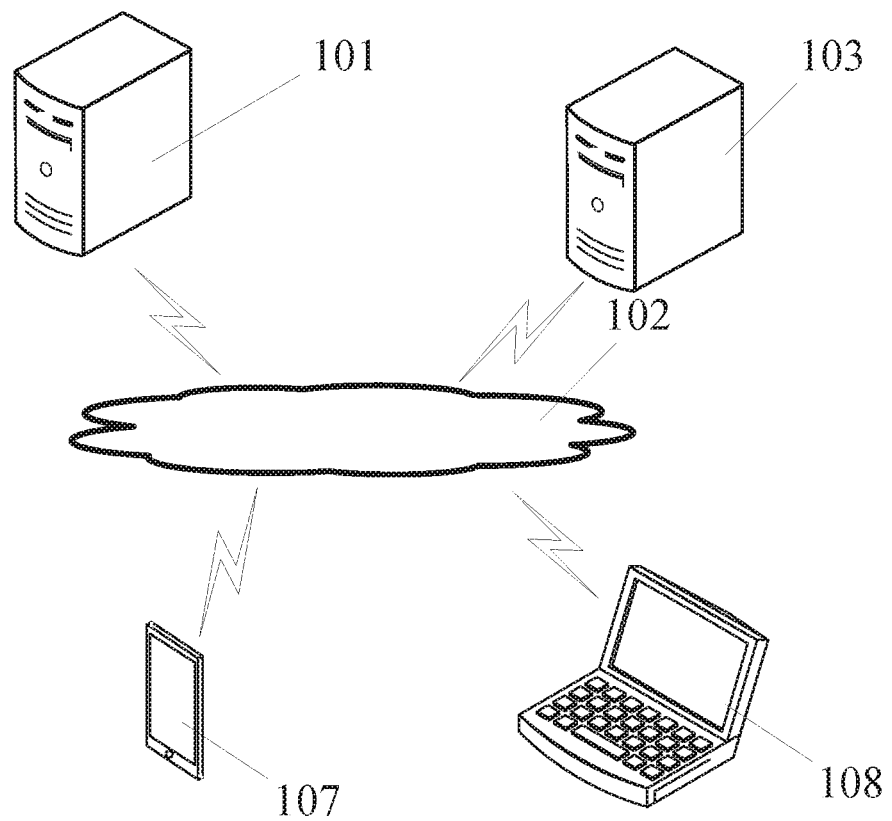
FIG. 3 is a schematic diagram of an application scenario of the method for updating information according to the present disclosure.

With further reference to FIG. 3, FIG. 3 is a schematic diagram of an application scenario of the method for updating information according to the present embodiment. In the application scenario of FIG. 3, a data processing server 101, a network 102, an information server 103, and terminal devices 107, 108 are included. The data processing server 101 may first acquire to-be-processed summary information of a web fiction (information source) from the information server 103 through the network 102, thereby obtaining an initial information source subject name entry. When the web fiction on the information server 103 has an update content (i.e., to-be-processed information), the data processing server 101 may acquire at least one subject name entry from the update content. Then, the data processing server 101 matches the acquired subject name entry with the initial information source subject name entry, and sets a weight for the subject name entry. Finally, the data processing server 101 sorts the subject name entry and the initial information source subject name entry according to the weight to determine the updated initial information source subject name entry.

The method provided by the above embodiment of the present disclosure first acquires at least one subject name entry from to-be-processed information, then matches the subject name entry with pre-acquired at least one initial information source subject name entry, and sets a weight for the matched subject name entry based on a matching result, and finally sorts the entries according to the weight to obtain updated at least one initial information source subject name entry, thereby improving the accuracy and efficiency of acquiring information by a user.

Figure 4:
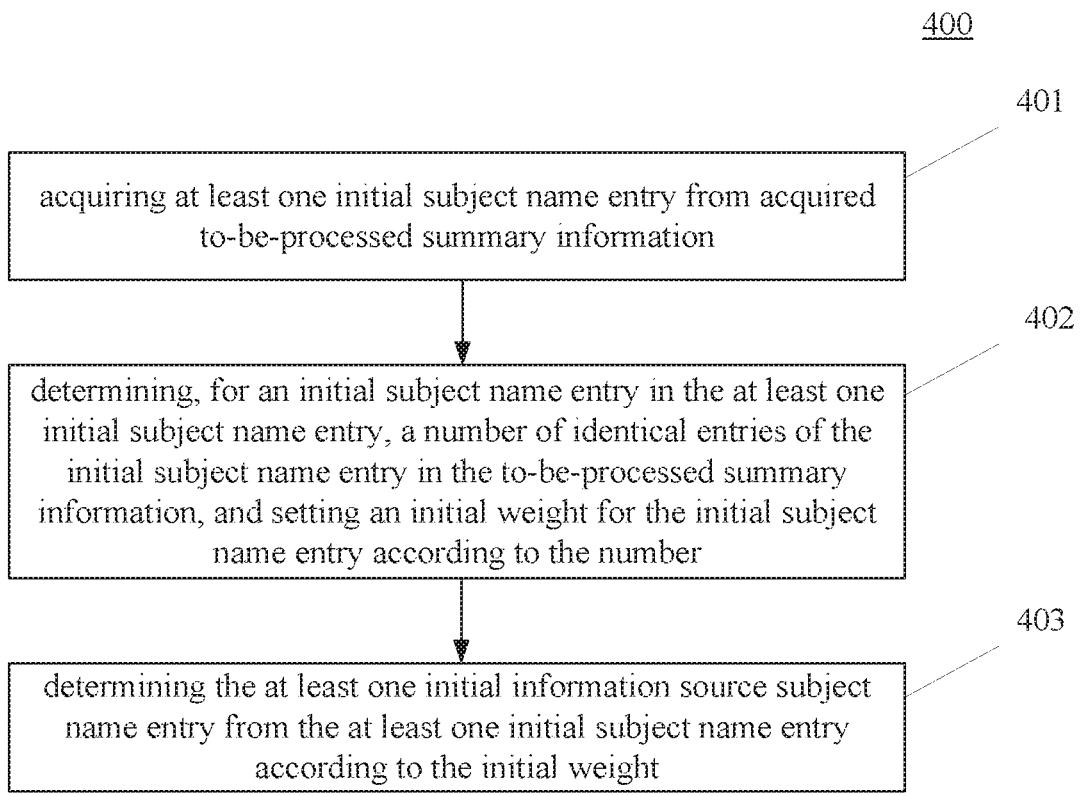
FIG. 4 is a flowchart of an embodiment of acquiring an initial information source subject name entry according to the present disclosure.

With further reference to FIG. 4, a flow 400 of an embodiment of acquiring an initial information source subject name entry is illustrated. The flow 400 of the acquiring an initial information source subject name entry includes the following steps 401 to 403.

Step 401 includes acquiring at least one initial subject name entry from acquired to-be-processed summary information.

In the present embodiment, an executing body (for example, the data processing server 101 shown in FIG. 1) on which a method for acquiring an initial information source subject name entry runs may acquire to-be-processed summary information from the information servers 103, 104, 105, 106 through a wired connection or a wireless connection.

Before processing the subject name entry in the to-be-processed information, the executing body needs to first acquire the initial information source subject name entry, and process the subject name entry in the to-be-processed information based on the initial information source subject name entry. Generally, the information source may have summary information, which may usually be an overview of the information source. For a certain information source, the executing body first acquires the summary information. The summary information may provide a rough description of the content of the information source with the information source subject in the information source as a clue. To this end, the executing body may process the to-be-processed summary information, and acquire at least one initial information source subject name entry from the to-be-processed summary information. The acquisition method is the same as the method of the embodiment corresponding to FIG. 2 above, and detailed description thereof will be omitted.

Step 402 includes determining, for an initial subject name entry in the at least one initial subject name entry, a number of identical entries of the initial subject name entry in the to-be-processed summary information, and setting an initial weight for the initial subject name entry according to the number.

The executing body may determine the number of the identical entries of each initial subject name entry in the to-be-processed summary information, and set the initial weight for each initial subject name entry on this basis. Generally, the more number of the identical entries of the initial subject name entry, the higher the initial weight of the initial subject name entry.

Step 403 includes determining the at least one initial information source subject name entry from the at least one initial subject name entry according to the initial weight.

The information source subject of the information source tends to be used more frequently than other subjects, and having higher initial weight. Therefore, the executing body may filter the at least one initial subject name entry of the to-be-processed summary information according to the initial weight, and use the subject corresponding to the initial subject name entry whose initial weight reaches a set requirement as the initial information source subject. Then, the initial information source subject name entry is determined based on the initial information source subject.

Figure 5:
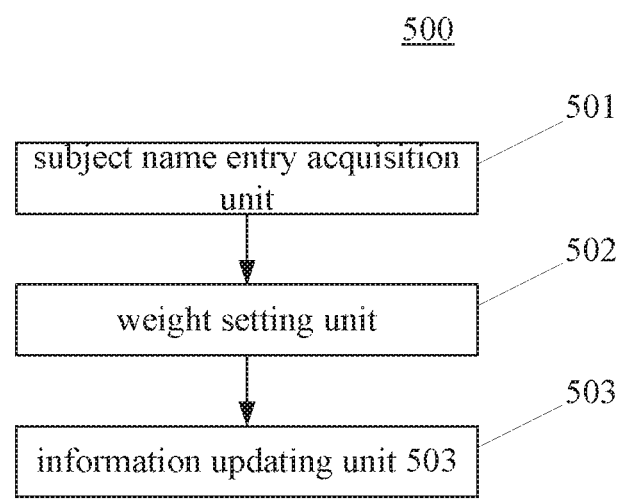
FIG. 5 is a schematic structural diagram of an embodiment of an apparatus for updating information according to the present disclosure.

With further reference to FIG. 5, as an implementation of the method shown in the above figures, the present disclosure provides an embodiment of an apparatus for updating information, and the apparatus embodiment corresponds to the method embodiment as shown in FIG. 2, and the apparatus may be specifically applied to various electronic devices.

As shown in FIG. 5, the apparatus 500 for updating information of the present embodiment may include: a subject name entry acquisition unit 501, a weight setting unit 502 and an information updating unit 503. The subject name entry acquisition unit 501 is configured to acquire at least one subject name entry from to-be-processed information. The weight setting unit 502 is configured to match, for a subject name entry in the at least one subject name entry, the subject name entry with pre-acquired at least one initial information source subject name entry, and set a weight for the matched subject name entry based on a matching result, the initial information source subject name entry and the to-be-processed information corresponding to the same information source, and the weight being used to represent a probability that a subject corresponding to the matched subject name entry is an information source subject of the information source. The information updating unit 503 is configured to sort the subject name entry in the at least one subject name entry and an initial information source subject name entry in the at least one initial information source subject name entry according to the weight to obtain updated at least one initial information source subject name entry.

In some alternative implementations of the present embodiment, the subject name entry acquisition unit 501 may include: a grammatical relationship querying subunit (not shown in the figure), an updated to-be-processed information acquisition subunit (not shown in the figure) and a subject name entry extraction subunit (not shown in the figure). The grammatical relationship querying subunit is configured to query a grammatical relationship of a sentence in the to-be-processed information. The updated to-be-processed information acquisition subunit is configured to correct the sentence contained in the to-be-processed information according to the grammatical relationship to obtain updated to-be-processed information. The subject name entry extraction subunit is configured to perform information extraction on the updated to-be-processed information to obtain the at least one subject name entry.

In some alternative implementations of the present embodiment, the updated to-be-processed information acquisition subunit may include: a to-be-processed sentence querying module (not shown in the figure) and an updated to-be-processed information acquisition module (not shown in the figure). The to-be-processed sentence querying module is configured to query at least one to-be-processed sentence in the to-be-processed information, where the to-be-processed sentence is a sentence lacking a subject name entry. The updated to-be-processed information acquisition module is configured to add, for a to-be-processed sentence in the at least one to-be-processed sentence, a subject name entry to the to-be-processed sentence according to the grammatical relationship corresponding to the to-be-processed sentence to obtain corrected updated to-be-processed information.

In some alternative implementations of the present embodiment, the updated to-be-processed information acquisition module may include: an information adding submodule (not shown in the figure), configured to add a corresponding subject name entry to the to-be-processed sentence according to the grammatical relationship.

In some alternative implementations of the present embodiment, the to-be-processed sentence includes a subject name pronoun, and the updated to-be-processed information acquisition module may include: an information replacing submodule (not shown in the figure), configured to replace the subject name pronoun in the to-be-processed sentence with a corresponding subject name entry according to the grammatical relationship.

In some alternative implementations of the present embodiment, the apparatus 500 for updating information may include an initial information source subject name entry acquisition unit (not shown in the figure), configured to acquire the initial information source subject name entry, and the initial information source subject name entry acquisition unit may include: an initial subject name entry acquisition subunit (not shown in the figure), an initial weight setting subunit (not shown in the figure) and an initial information source subject name entry determining subunit (not shown in the figure). The initial subject name entry acquisition subunit is configured to acquire at least one initial subject name entry from acquired to-be-processed summary information. The initial weight setting subunit is configured to determine, for an initial subject name entry in the at least one initial subject name entry, the number of identical entries of the initial subject name entry in the to-be-processed summary information, and set an initial weight for the initial subject name entry according to the number. The initial information source subject name entry determining subunit is configured to determine the at least one initial information source subject name entry from the at least one initial subject name entry according to the initial weight.

The present embodiment further provides a server, including: one or more processors; and a storage apparatus, storing one or more programs thereon, the one or more programs, when executed by the one or more processors, cause the one or more processors to implement the above method for updating information.

The present embodiment further provides a computer readable medium, storing a computer program thereon, the program, when executed by a processor, implements the above method for updating information.

Figure 6:
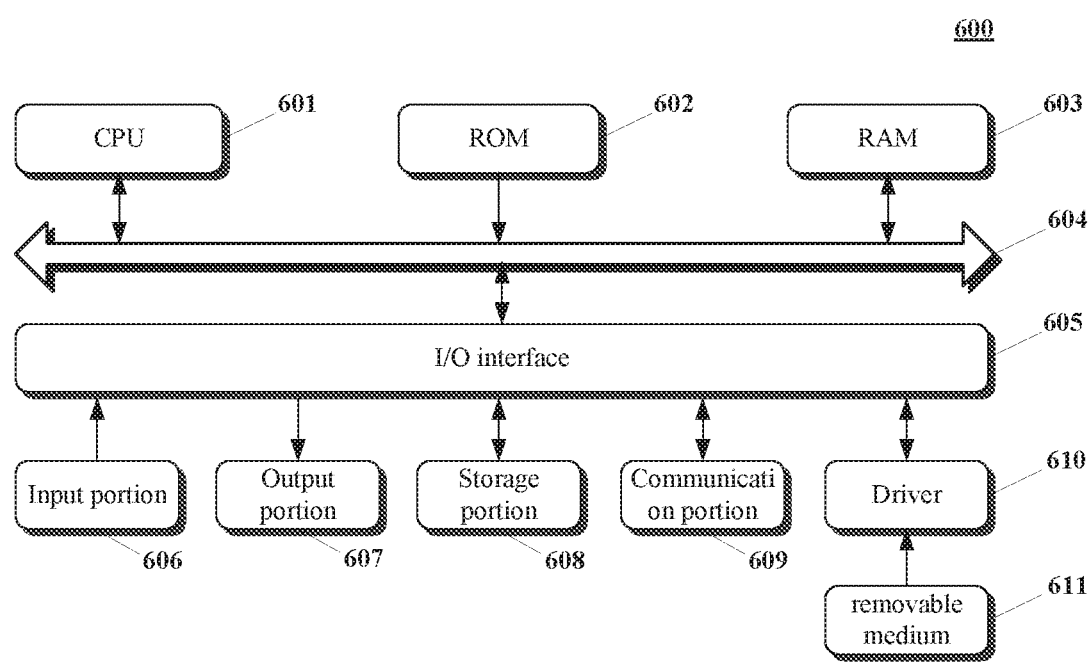
FIG. 6 is a schematic structural diagram of a computer system adapted to implement a server of the embodiments of the present disclosure.

With further reference to FIG. 6, a schematic structural diagram of a computer system 600 adapted to implement a server (for example, the data processing server 101 in FIG. 1) of the embodiments of the present disclosure is shown. The server shown in FIG. 6 is merely an example, and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including a subject name entry acquisition unit, a weight setting unit and an information updating unit. Here, the names of these units do not in some cases constitute limitations to such units themselves. For example, the information updating unit may also be described as "a unit for updating an information source subject name entry of an information source".

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: acquire at least one subject name entry from to-be-processed information; match, for a subject name entry in the at least one subject name entry, the subject name entry with pre-acquired at least one initial information source subject name entry, and set a weight for the subject name entry based on a matching result, the initial information source subject name entry and the to-be-processed information corresponding to the same information source, and the weight being used to represent a probability that a subject corresponding to the subject name entry is an information source subject of the information source; and sort the subject name entry in the at least one subject name entry and an initial information source subject name entry in the at least one initial information source subject name entry according to the weight to obtain updated at least one initial information source subject name entry.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for updating subject name information of a target information source, the method comprising:
   receiving newly published content, uploaded by a first terminal, of the target information source, determining the newly published content as to-be-processed information and acquiring at least one subject name from the to-be-processed information, the to-be-processed information being a text and the subject name identifying a subject in content of the target information source;
   for each subject name in the at least one subject name, matching the subject name with an initial subject name in pre-acquired at least one initial subject name of the target information source, and determining a weight for each subject name and a weight for each initial subject name based on a matching result, the matching result indicating whether a subject name is identical with an initial subject name;
   combining and sorting the at least one subject name and the at least one initial subject name according to the weight for each subject name and the weight for each initial subject name to obtain a sorting result, and determining a preset number of subject names on top of the sorting result as updated initial subject names;
   associating the updated initial subject names with the target information source; and presenting and storing the updated initial subject names, to enable a second terminal to retrieve content of the target information source according to the initial subject names,
wherein determining the weight for each subject name and the weight for each initial subject name based on a matching result comprises:
acquiring a current weight of each initial subject name, the current weight being an occurrence number of the initial subject name in an abstract of the to-be-processed information;
in response to a matching result indicating that a subject name is identical with an initial subject name, increasing the current weight of this identical initial subject name;
in response to a matching result indicating that no subject name is identical with an initial subject name, decreasing the current weight of this initial subject name; and
in response to the matching result indicating that no initial subject name is identical with a subject name, determining a weight of this subject name to be less than each current weight.

2. The method according to claim 1, wherein acquiring at least one subject name from the to-be-processed information comprises:
querying a grammatical relationship of a sentence in the to-be-processed information, and determining whether a sentence component in the sentence is omitted;
in response to determining that a sentence component in the sentence is omitted, correcting the sentence in the to-be-processed information according to the grammatical relationship to obtain updated to-be-processed information; and
performing information extraction on the updated to-be-processed information to obtain the at least one subject name.

3. The method according to claim 2, wherein correcting the sentence in the to-be-processed information according to the grammatical relationship to obtain updated to-be-processed information comprises:
querying at least one to-be-processed sentence in the to-be-processed information, wherein the to-be-processed sentence is a sentence lacking a subject name; and
adding, for a to-be-processed sentence in the at least one to-be-processed sentence, a subject name to the to-be-processed sentence according to the grammatical relationship corresponding to the to-be-processed sentence to obtain corrected updated to-be-processed information.

4. The method according to claim 3, wherein adding a subject name to the to-be-processed sentence according to the grammatical relationship corresponding to the to-be-processed sentence comprises:
adding a corresponding subject name to the to-be-processed sentence according to the grammatical relationship.

5. The method according to claim 3, wherein the to-be-processed sentence comprises a subject name pronoun, and
adding the subject name to the to-be-processed sentence according to the grammatical relationship corresponding to the to-be-processed sentence comprises:
replacing the subject name pronoun in the to-be-processed sentence with a corresponding subject name according to the grammatical relationship.

6. The method according to claim 1, wherein the at least one initial subject name is acquired by:
acquiring at least one original subject name from acquired to-be-processed summary information of the target information source;
determining, for an original subject name in the at least one original subject name, an occurrence number of the original subject name in the to-be-processed summary information, and setting an original weight for the original subject name according to the occurrence number; and
determining the at least one original subject name from the at least one original subject name according to the original weight.

7. An apparatus for updating information, the apparatus comprising:
at least one processor; and
a memory storing instructions, wherein the instructions when executed by the at least one processor, cause the at least one processor to perform operations, the operations comprising:
receiving newly published content, uploaded by a first terminal, of the target information source, determining the newly published content as to-be-processed information, and acquiring at least one subject name from the to-be-processed information, the to-be-processed information being a text and the subject name identifying a subject in content of the target information source;
for each subject name in the at least one subject name, matching the subject name with an initial subject name in pre-acquired at least one initial subject name of the target information source, and determining a weight for each subject name and a weight for each initial subject name based on a matching result, the matching result indicating whether a subject name is identical with an initial subject name;
combining and sorting the at least one subject name and the at least one initial subject name according to the weight for each subject name and the weight for each initial subject name, to obtain a sorting result, and determining a preset number of subject names on top of the sorting result as updated initial subject names;
associating the updated initial subject names with the target information source; and
presenting and storing the updated initial subject names, to enable a second terminal to retrieve content of the target information source according to the initial subject names,
wherein determining the weight for each subject name and the weight for each initial subject name based on a matching result comprises;
acquiring a current weight of each initial subject name, the current weight being an occurrence number of the initial subject name in an abstract of the to-be-processed information;
in response to a matching result indicating that a subject name is identical with an initial subject name, increasing the current weight of this identical initial subject name;
in response to a matching result indicating that no subject name is identical with an initial subject name, decreasing the current weight of this initial subject name; and
in response to the matching result indicating that no initial subject name is identical with a subject name, determining a weight of this subject name to be less than each current weight.

8. The apparatus according to claim 7, wherein acquiring at least one subject name from the to-be-processed information comprises:
- querying a grammatical relationship of a sentence in the to-be-processed information, and determining whether a sentence component in the sentence is omitted;
- in response to determining that a sentence component in the sentence is omitted, correcting the sentence in the to-be-processed information according to the grammatical relationship to obtain updated to-be-processed information; and
- performing information extraction on the updated to-be-processed information to obtain the at least one subject name.

9. The apparatus according to claim 8, wherein correcting the sentence in the to-be-processed information according to the grammatical relationship to obtain updated to-be-processed information comprises:
- querying at least one to-be-processed sentence in the to-be-processed information, wherein the to-be-processed sentence is a sentence lacking a subject name; and
- adding, for a to-be-processed sentence in the at least one to-be-processed sentence, a subject name to the to-be-processed sentence according to the grammatical relationship corresponding to the to-be-processed sentence to obtain corrected updated to-be-processed information.

10. The apparatus according to claim 9, wherein adding a subject name to the to-be-processed sentence according to the grammatical relationship corresponding to the to-be-processed sentence, comprises:
- adding a corresponding subject name to the to-be-processed sentence according to the grammatical relationship.

11. The apparatus according to claim 9, wherein the to-be-processed sentence comprises a subject name pronoun, and
- adding a subject name to the to-be-processed sentence according to the grammatical relationship corresponding to the to-be-processed sentence comprises:
- replacing the subject name pronoun in the to-be-processed sentence with a corresponding subject name according to the grammatical relationship.

12. The apparatus according to claim 7, wherein at least one initial subject name is acquired by:
- acquiring at least one original subject name from acquired to-be-processed summary information;
- determining, for an original subject name in the at least one original subject name, an occurrence number the original subject name in the to-be-processed summary information, and setting an original weight for the original subject name according to the number; and
- determining the at least one initial subject name from the at least one original subject name according to the original weight.

13. A non-transitory computer readable medium, storing a computer program thereon, the program, when executed by a processor, causing the processor to perform operations, wherein the operations comprise:
- receiving newly published content, uploaded by a first terminal, of a target information source, determining the newly published content as to-be-processed information and acquiring at least one subject name from the to-be-processed information, the to-be-processed information being a text and the subject name identifying a subject in content of the target information source;
- for each subject name in the at least one subject name, matching the subject name with an initial subject name in pre-acquired at least one initial subject name of the target information source, and determining a weight for each subject name and a weight for each initial subject name based on a matching result, the matching result indicating whether a subject name is identical with an initial subject name;
- combining and sorting the at least one subject name and the at least one initial subject name according to the weight for each subject name and the weight for each initial subject name, to obtain a sorting result, and determining a preset number of subject names on top of the sorting result as updated initial subject names;
- associating the updated initial subject names with the target information source; and
- presenting and storing the updated initial subject names, to enable a second terminal to retrieve content of the target information source according to the initial subject names,
  - wherein determining the weight for each subject name and the weight for each initial subject name based on a matching result comprises:
- acquiring a current weight of each initial subject name, the current weight being an occurrence number of the initial subject name in an abstract of the to-be-processed information;
- in response to a matching result indicating that a subject name is identical with an initial subject name, increasing the current weight of this identical initial subject name;
- in response to a matching result indicating that no subject name is identical with an initial subject name, decreasing the current weight of this initial subject name; and
- in response to the matching result indicating that no initial subject name is identical with a subject name, determining a weight of this subject name to be less than each current weight.

* * * * *